United States Patent [19]

Lomas

[11] Patent Number: 5,452,757
[45] Date of Patent: * Sep. 26, 1995

[54] PULSE PUMPED CATALYST HEAT EXCHANGER

[75] Inventor: David A. Lomas, Barrington, Ill.

[73] Assignee: UPO, Des Plaines, Ill.

[*] Notice: The portion of the term of this patent subsequent to Dec. 28, 2010 has been disclaimed.

[21] Appl. No.: 173,338

[22] Filed: Dec. 23, 1993

Related U.S. Application Data

[63] Continuation-in-part of Ser. No. 996,540, Dec. 24, 1992, Pat. No. 5,273,107.

[51] Int. Cl.⁶ ............................................. B01J 38/32
[52] U.S. Cl. .................. 165/104.16; 422/145; 422/146; 502/44
[58] Field of Search .................. 165/104.16, 104.18; 422/145, 146; 502/44

[56] References Cited

U.S. PATENT DOCUMENTS

| | | | |
|---|---|---|---|
| 2,377,657 | 6/1945 | Watts | 196/52 |
| 2,492,948 | 1/1950 | Berger | 252/417 |
| 2,735,802 | 2/1956 | Jahnig | 196/52 |
| 2,862,798 | 2/1958 | McKinney | 23/288 |
| 2,970,117 | 1/1961 | Harper | 252/417 |
| 3,672,069 | 6/1972 | Reh et al. | 34/20 |
| 4,238,631 | 12/1980 | Daviduk et al. | 585/469 |
| 4,396,531 | 8/1983 | Lomas | 252/417 |
| 4,424,192 | 1/1984 | Lomas et al. | 165/104.16 |
| 4,434,245 | 2/1984 | Lomas et al. | 502/2 |
| 4,439,533 | 3/1984 | Lomas et al. | 502/6 |
| 4,690,802 | 9/1987 | Jenkinson | 165/104.16 |
| 4,710,357 | 12/1987 | Cetinkaya et al. | 422/145 |
| 4,958,680 | 9/1990 | Barnes et al. | 165/104.16 |
| 4,971,767 | 11/1990 | Ludwigsen et al. | 165/104.16 |
| 5,060,599 | 1/1991 | Chambert | 165/104.16 |
| 5,128,292 | 7/1992 | Lomas | 502/44 |
| 5,141,708 | 8/1992 | Campbell, Jr. et al. | 165/104.16 |
| 5,273,107 | 12/1993 | Lomas | 165/104.16 |

Primary Examiner—Martin P. Schwadron
Assistant Examiner—L. R. Leo
Attorney, Agent, or Firm—Thomas K. McBride; John G. Tolomei

[57] ABSTRACT

A method of heating or cooling particulate material by indirect heat exchange of the particles with a heat exchange fluid in a heat exchanger is improved by the use of a gas vent that operates to pump catalyst into and out of a heat exchanger. A periodic build-up of fluidizing medium in a particle cycling zone intermittently causes catalyst to flow into out of a heat exchanger. The method and apparatus of this invention are particularly useful for the cooling of FCC catalyst and simplifies the addition of a cooler by allowing the use of small size catalyst transfer lines.

8 Claims, 3 Drawing Sheets

PULSE PUMPED CATALYST HEAT EXCHANGER

CROSS REFERENCE TO RELATED APPLICATIONS

This application is continuation in part of U.S. Ser. No., filed Dec. 24, 1992, 07/996,540 now issued as U.S. Pat. No. 5,273,107, the contents of which are hereby incorporated by reference.

FIELD OF THE INVENTION

This invention relates to methods and heat exchanger for heating or cooling particulate material. More particularly, this invention relates to methods for heating or cooling hot particles by indirect heat exchange and heat exchanger for use therein.

BACKGROUND OF THE INVENTION

Heat exchanger for heating or cooling particulate comminuted or fine grade material by indirect contact with a heating or cooling fluid are well known. Heat exchanger of this type maintain the particulate material in a fluidized state with a fluidizing medium that passes upwardly through a bed of the material. A series of conduits comprising tubes, channels or coils are positioned within the fluidized bed. A fluid passes through the conduits to add or remove heat from the fluidized solids by indirect heat exchange. Fluidized solids are continuously supplied to the fluidized bed and fluidized solids are continuously withdrawn from the bed. Methods of supplying or withdrawing solids from the bed through the exchanger include flow through and backmix type exchanger. There are two basic versions of flow through coolers; one uses gravity feed wherein particles enter an upper inlet and exit a lower outlet, and the other employs fluidized transport that moves particles from a lower inlet past the cooling conduits and out an upper outlet. In a backmix operation particles are circulated through a common inlet and outlet that exchanges particles with the rest of the process.

Heat exchanger for the indirect heating or cooling of particulate material have found widespread application in a number of industrial processes. These processes include treatment of mineral matter, the handling of metallurgical ores, the manufacture of petrochemicals and the conversion of hydrocarbons. A number of exchanger configurations have evolved to suit the needs of these different processes.

Indirect heat exchanger of the above-described type have been finding increasing use as particle coolers on the regenerators of processes for the fluidized catalytic conversion of hydrocarbons. The fluidized catalytic cracking process (hereinafter FCC) has been extensively relied upon for the conversion of hydrocarbon streams such as vacuum gas oils and other relatively heavy oils into lighter and more valuable products. In the FCC process, starting hydrocarbon material contacts a finely divided particulate catalyst which is fluidized by a gas or vapor. As the particulate material catalyzes the cracking reaction, a by-product of the cracking reaction referred to as coke is surface-deposited thereon. A regenerator, which is an integral part of the FCC process, continuously removes coke from the catalyst surface by oxidation. Oxidation of the coke releases a large amount of heat which in part supplies the heat input needed for the cracking reaction. As FCC units have been called upon to process heavier feeds, greater amounts of coke must be removed in the regeneration zone with a corresponding increase in the amount of heat generated therein. This additional heat poses a number of problems for the FCC process. The excess heat can upset the thermal balance of the process thereby requiting a lowering of the circulation of hot catalyst from the regenerator to the reactor which in turn can lower the yield of valuable products. In addition, the excess heat may raise temperatures to the point of damaging the equipment or catalyst particles. Therefore, it is advantageous to have a means of lowering the regenerator temperature. For reasons of temperature control and process flexibility, heat exchanger having cooling tubes located outside the regenerator vessel have become the method of choice.

An important consideration in the FCC process as well as other processes that involve the handling of particulate material is the transport of the particulate material. It is often difficult to incorporate a heat exchanger having the necessary dimensions to provide the desired degree of particulate heat transfer into the constraints of the process arrangement. In the main, these constraints involve obtaining sufficient exchanger length to accommodate the required surface area of the exchanger conduits and providing inlets and outlets for the movement of the particles between the exchanger and the rest of the process unit. In the case of an FCC process unit, addition of a particle heat exchanger may necessitate raising the entire structure, or the incorporation of extra conduits and fluidization devices in order to meet the exchanger design requirements. When the particle heat exchanger is added to a newly designed FCC unit, the increased elevation and/or added conduits and fluidization devices raise costs and complicate construction of the unit. It is also popular to retrofit particulate heat exchanger into existing FCC process units. In these cases, the structural constraints may not only add to the cost of the unit, but may not permit the incorporation of a particulate exchanger having the desired heat removal capacity.

The use of a backmix type exchanger, as previously mentioned, will simplify the incorporation of the particle heat exchanger into any process since it only requires the use of a single inlet/outlet conduit. However, the overall heat exchange capacity of this type of device is limited by the amount of catalyst circulation that can be obtained over its vertical length. Moreover, the overall heat transfer per length of cooling conduit available in the backmix cooler is lower than in the flow through type exchanger where catalyst flows from an inlet in one end of the heater exchanger to an outlet at the opposite end. Finally, an additional layout constraint of the backmix type cooler is its need for a very large inlet/outlet conduit in order to obtain adequate particle circulation between the heat exchanger and a retention bed from where the heated and cooled particles are withdrawn and returned. Therefore, the backmix type exchanger cannot overcome many of the layout problems associated with the incorporation of a remote particle heat exchanger into a process that requires heating or cooling of particulate material.

INFORMATION DISCLOSURE

U.S. Pat. No. 2,377,657 issued to G. W. Watts shows a process involving the transport of particulate material, comprising a catalyst for use in a fluidized catalytic cracking process by gravity flow into an inlet located at one end of an elongated heat exchanger that cools the particles by indirect contact with water. The water passes through a series of conduits for the regeneration of steam. Cooled particles leave through an outlet located at an opposite end of the exchanger and are transported away from an outlet by a fluidizing medium. This reference is cited for its general showing of a particle heat exchanger having gravity feed of particulate material.

U.S. Pat. No. 2,862,798 issued teaches a process for cooling FCC catalyst particles wherein the particles are withdrawn from a regenerator by gravity flow and transported by fluidizing medium upwardly through a particulate heat exchanger for indirect cooling with a cooling fluid medium. The fluidizing medium transports the catalyst upwardly to a cooler outlet and back to the regenerator. This reference shows the use of a fluidizing medium to transport particulate material through a heat exchanger.

U.S. Pat. No. 2,970,117 issued to Harper shows a particle heat exchanger that receives hot catalyst particles from an FCC regenerator through an upper inlet and empties the particles from a lower outlet into a riser conduit that uses a fluidizing gas to transport the cooled catalyst particles back to the regenerator. This reference shows the use of a fluidizing medium to transport cooled particulate material back to the vessel from which it was withdrawn.

U.S. Pat. No. 3,672,069 issued to Reh et al. shows a backmix type fluidized bed heat exchanger where catalyst is mixed by a fluidizing gas in a series of compartments and transported across the top of the compartments. Each succeeding compartment has a lower elevation so that the particles gravitate to a final compartment from which the particulate material is withdrawn. Conduits within the compartments receive a heat exchange fluid for cooling or heating of the particulate material. This reference shows the generalized use of backmix type particle heat exchanger.

In U.S. Pat. No. 2,492,948 a heat exchanger for cooling particulate material receives FCC catalyst particles at its upper end through an outer annular area which carries the catalyst to the bottom of the heat exchanger where a fluidizing medium transports the catalyst upwardly through a series of conduits containing cooling fluid and ejects the catalyst back into the regenerator at a higher elevation than that from which it was withdrawn. This reference shows a particle heat exchanger having internal means for receiving and transporting catalyst through the device.

U.S. Pat. No. 4,439,533 issued to Lomas et al. depicts a particle heat exchanger of the backmix type that exchanges FCC catalysts between the heat exchanger and a catalyst particle retention zone in the regenerator. This reference shows the use of a backmix catalyst cooler in an FCC process.

U.S. Pat. No. 4,434,245 issued to Lomas et al. is directed to the use of a particle heat exchanger in an FCC process having a catalyst disengaging zone and a separate combustion zone. Hot catalyst particles are taken from the disengaging zone, transported downwardly through the cooler in indirect heat exchange with a cooling fluid and taken from the bottom of the heat exchanger to a lift riser for transport of the catalyst into the combustion zone. This reference shows the use of a particle heat exchanger in an FCC process having a lower combustion zone and an upper catalyst retention zone.

In U.S. Pat. No. 4,396,531, hot catalyst from the retention zone of an FCC regenerator supplies particulate catalyst to a heat exchanger for cooling the particulate catalyst by indirect contact with water and transfers the cooled catalyst to an FCC reactor. This reference shows the removal of cooled particulate material from the FCC regeneration zone.

U.S. Pat. No. 4,238,631 issued to Daviduk et al. shows a heat exchanger for cooling particulate catalyst from an FCC regenerator having a hot catalyst inlet in the middle of the heat exchanger vessel, a catalyst outlet at the bottom of the heat exchanger vessel for returning catalyst to the regenerator, and a conduit at the top of the exchanger for venting gas from the heat exchanger back to the regenerator. Cooling fluid conduits located below the catalyst inlet remove heat from the catalyst by indirect heat exchange therewith. This reference shows a particle inlet in a mid portion of a particle heat exchanger.

U.S. Pat. No. 2,735,802 issued to Jahnig depicts a particulate heat exchanger that receives particulate catalyst from an FCC regenerator through an inlet located at a mid portion of the heat exchanger. Catalyst is returned to the regenerator through an outlet located at the bottom of the heat exchanger and a conduit located at the top of the heat exchanger vents gases back to the regenerator. The exchanger has conduits above and below the catalyst inlet for circulating coolant. The inventory of catalyst particles in the heat exchanger is adjusted to vary the level of catalyst in the heat exchanger and in contact with the cooling conduits in order to vary the amount of heat removal. This reference shows a heat exchanger with heating and cooling conduits above and below a particle inlet.

SUMMARY OF THE INVENTION

This invention is a method of heating or cooling particulate material by indirect heat exchange of the particles with a heat exchange fluid in a heat exchanger having a gas vent that operates to pump catalyst into and out of a heat exchanger through by pulses of a pressurizing gas. The method of pumping catalyst into and out of the heat exchanger eliminates the necessity of providing multiple conduits for a circulation path through the heat exchanger as required for a flow through cooler. The method of this invention also eliminates the need for a large opening and a short distance between the heat exchanger and the bed retaining the catalyst particles to obtain adequate flow for the operation of a backmix type heat exchanger. The pumping method of this invention uses ordinary fluidization gas from the cooler in combination with a vent line and valve. As a result this invention does not require large amounts of additional equipment over that ordinarily required for a cooler. Furthermore, the method of this invention lends itself to simple integration into existing heat exchanger with a minimal amount of additional equipment.

It is an object of this invention to increase the heat transfer capacity of particle heat exchanger.

It is a further object of this invention to provide a method of cooling particles and a particle heat exchanger having improved heat transfer capacity.

Another object of this invention is to provide a particle heat exchanger that is easily adapted to the configuration of the equipment supplying the particles.

A yet further object of this invention is to improve the method of regulating heat transfer in the indirect heat exchange of particles with a heat exchange fluid.

Accordingly, in one embodiment, this invention is a method for heating or cooling particles. The method comprises collecting particles in a catalyst bed and transferring the particles to a heat exchange zone through a particle exchange passageway. In this method the heat exchange zone transfers heat between the particles in the heat exchanger and a heat transfer fluid by indirect heat exchange in the heat exchange zone. A fluidizing gas fluidizes the particles in the heat exchange zone. The fluidizing gas passes to a particle cycling zone located in an upper portion of the heat exchange zone and vents fluidizing gas from the particle cycling zone via a vent conduit. Periodically pulsing an increased flow of fluidizing gas into the particle cycling zone displaces particles from the particle cycling zone and causes particles to flow out of the heat exchange zone and back into the catalyst bed through the passageway or the vent conduit.

In a yet further embodiment, this invention is directed to an apparatus for heating or cooling fluidized particles. In combination, the apparatus contains a vertically oriented, elongated heat exchanger for indirectly contacting the particles with a heat transfer fluid; a particle cycling chamber defined at least in part by an upper portion of the heat exchanger; a plurality of heat exchange tubes in the heat exchanger; a passageway for adding and withdrawing particles from the heat exchanger defining an opening in the heat exchanger below the particle cycling chamber; means for adding gas to the heat exchanger; means for venting gas out of the particle cycling chamber and pulsing a an increased quantity of vent gas into the particle cycling chamber particle cycling chamber.

The method and apparatus of this invention have been found to be particularly beneficial for back mix type heat exchanger that operate to cool catalyst. This invention eliminates the need for a large opening to promote reflux catalyst circulation about the top of the cooler. Catalyst pumping by the method of this invention forces catalyst circulation through even a relatively small catalyst inlet and outlet passageway and can pass fluidizing gas out of an even smaller gas vent. A positive cyclic exchange of hot catalyst maintains a high average heat transfer condition in the cooler by the regular addition of a large volume of hot catalyst. Therefore this invention improves the typical back-mix arrangement having an inlet at the top of the cooler.

Nevertheless a heat exchanger operating in accordance with this invention may have the catalyst exchange passageway located at any point in the cooler. The only requirements of the pumping action are communication of the heat exchange zone with a source of catalyst having sufficient density to provide a head of catalyst for driving catalyst into the exchanger, a catalyst retention volume located above the opening of a catalyst exchange conduit that provides a place for cycling catalyst into and out of the heat exchange zone and means for periodically pulsing a surge of fluidizing gas into the heat exchanger. In operation, the catalyst head associated with the catalyst source pushes catalyst into the catalyst cycling chamber that functions as a catalyst retention volume to build up an inventory of catalyst while fluidizing gas enters the exchanger at a first flow. Sometime after the retention volume has filled with catalyst, a pulse of fluidizing air quickly raises the gas flow rate through the retention volume. Pressure build up associated with the gas flow displaces catalyst from the retention volume causing the catalyst to flow out of the retention volume. Catalyst flowing out of the retention volume may take two flow paths. One path results from the direct displacement of catalyst through the passageway by the build up of pressure through the retention volume causes catalyst flow out though the passageway. For sufficiently high gas flows it is also possible to simultaneously entrain catalyst with gas flow out of the vent conduit. After the retention volume has at least partially emptied the pulse of fluidizing gas subsides a reduced flow of fluidizing gas flows through the heat exchanger and the vent to conduit to once again cause hot catalyst to cycle into the heat exchanger through the catalyst exchange passageway as the retention volume fills. The heat exchanger can accept and reject catalyst at any location over the length of the heat exchanger. In order for the cycling to occur, the catalyst retention volume must be located in an upper portion of the heat exchanger and the vent line opening must communicate with the volume of the retention zone.

In a preferred form of the invention the vent conduit has a restricted flow area. The restricted flow area allows the normal flow of fluidizing gas to exit the retention volume while producing a minimal pressure drop. When the flow of fluidizing gas is periodically pulsed to the higher rate, the increased pressure drop created by the restricted flow area raises pressure in the retention volume and causes catalyst to flow out of the passageway and into a regenerator bed. In this arrangement the primary flow of catalyst out of the retention volume and through the passageway.

These simple requirements pose few restrictions and leave a great deal of flexibility in the heat exchanger design. Again the heat exchanger can employ relatively small conduits for catalyst exchange and gas venting. In addition these conduits do not require gravity flow or upward transport conditions to move catalyst between the heat exchanger and another vessel. Therefore, this invention frees the heat exchanger from the requirement of having a location adjacent to the vessel supplying the particulate material. The use of periodic surges of fluidizing gas to cyclically pressure catalyst out of the retention zone eliminates the need for any valving to control vent gas flow through the vent conduit. Since the vent gas will typically contain small amounts of fluidizing gas, any control valve in such a conduit is subject to erosion and its elimination will improve process reliability.

Other embodiments, details and arrangements of the present invention are described in the following detailed description.

DETAILED DESCRIPTION OF THE INVENTION

The present invention, in its process aspects, consists of steps for the heating or cooling of a fluidized particulate solid. The method and apparatus of this invention can be used for either the heating or cooling particles, however, for the sake of simplicity, the description will only make reference to particle cooling. An important application of the invention will be in a process for the combustion of a combustible material from fluidized solid particles containing the combustible material, including the step of introducing oxygen containing combustion gas and the fluidized solid particles into a combustion zone maintained at a temperature sufficient for oxidation of the combustible material. The combustible material will be oxidized therein to produce a dense phase fluidized bed of hot fluidized solid particles cooled by the process of this invention.

The above combustion zone may be in dilute phase with the hot particles transported to a disengaging zone wherein the hot particles are collected and maintained as the first mentioned bed, or the combustion zone may be in dense phase and in itself comprise the first bed. The term "dilute phase", as used herein, shall mean a mixture of catalyst particles and gas having a density of less than 30 lbs/ft$^3$, and "dense phase" shall mean a density of such mixture equal to or more than 30 lbs/ft$^3$.

In a particularly important embodiment of the invention, there will be included steps for the regenerative combustion within a regeneration zone of a coke containing FCC catalyst from a reaction zone to form hot flue gas and hot regenerated catalyst, disengagement and collection of the hot regenerated catalyst, cooling of the hot regenerated catalyst in a heat removal or, as more often referred to, cooling zone, comprising the heat exchanger of this invention and the return of the cooled regenerated catalyst to the regeneration or reaction zone for control of the temperatures of the catalyst therein. For the purposes of an FCC process, the term "hot regenerated catalyst" means regenerated catalyst at the temperature leaving the combustion zone, typically ranging from about 1250° to about 1450° F., while the term "cool regenerated catalyst" means regenerated catalyst at the temperature leaving the cooling zone, the latter of which is up to 200° F. less than the temperature of the hot regenerated catalyst.

Figure 1:
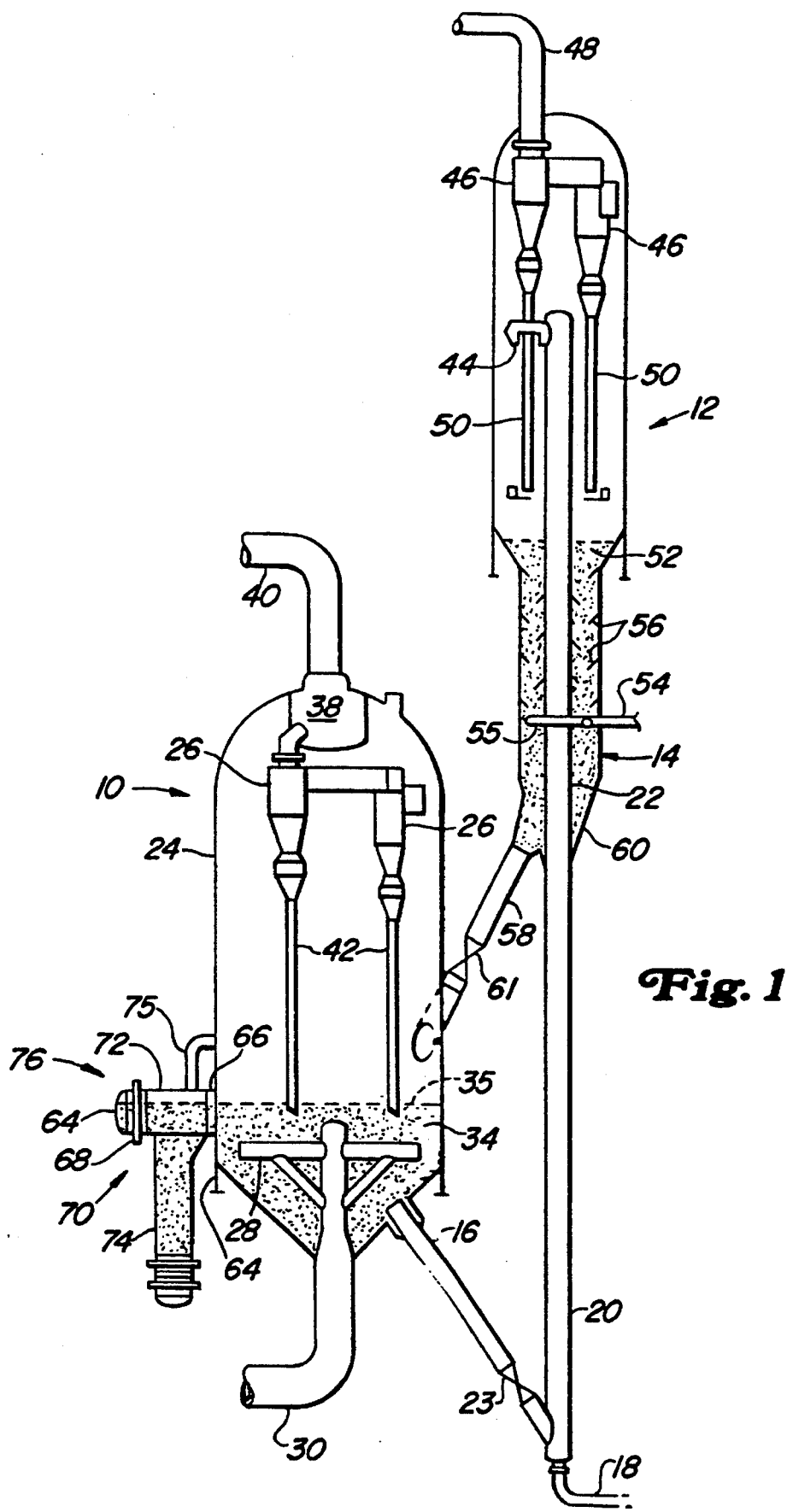
FIG. 1 is an elevation view of an FCC reactor-regenerator having a particle exchanger of this invention.

Reference will now be made to FIG. 1 for a discussion of the particle heat exchanger and the method of invention. FIG. 1 depicts the arrangement of this invention applied to backmix type cooler that depends from a large access manway and which is more fully disclosed in U.S. Pat. No. 4,971,767, the contents of which are hereby incorporated by reference. Additional details on the operation of a backmix cooling zone can be found in U.S. Pat. No. 4,439,533, the contents of which are hereby incorporated by reference.

Looking then at FIG. 1, the FCC arrangement has a regeneration vessel 10, a reactor 12, located to the side and above the regenerator, and a stripping vessel 14 located directly below the reactor. A regenerated catalyst conduit 16 transfers catalyst from the regenerator through a control valve 23 and into a riser conduit 20 where it contacts hydrocarbon feed entering the riser through hydrocarbon feed conduit 18. Conduit 18 may also contain a fluidizing medium such as steam which is added with the feed. Expanding gases from the feed and fluidizing medium convey catalyst up the riser and into internal riser conduit 22. As the catalyst and feed pass up to the riser, the hydrocarbon feed cracks to lower boiling hydrocarbon products.

Riser 22 discharges the catalyst and hydrocarbon mixture through opening 44 to effect an initial separation of catalyst and hydrocarbon vapors. Outside openings 44, a majority of the hydrocarbon vapors continue to move upwardly into the inlet of cyclone separators 46 which effects a near complete removal of catalyst from the hydrocarbon vapors. Separated hydrocarbon vapors exit reactor 12 through an overhead conduit 48 while a dip leg conduit 50 returns separated catalyst to a lower portion of the reactor vessel. Catalyst from riser outlets 44 and dip leg conduit 50 collects in a lower portion of the reactor forming a bed of catalyst 52. Bed 52 supplies catalyst to stripping vessel 14. Steam entering stripping vessel 14 through a conduit 54 is distributed by a ring 55 and rises countercurrent to a downward flow of catalyst through the stripping vessel thereby removing sorbed hydrocarbons from the catalyst which are ultimately recovered with the steam by cyclone separators 46. In order to facilitate hydrocarbon removal, a series of downwardly sloping baffles 56 are provided in the stripping vessel 14. A spent catalyst conduit 58 removes catalyst from a lower conical section 60 of stripping vessel 14. A control valve 61 regulates the flow of catalyst from conduit 58.

Regeneration gas, such as compressed air, enters regenerator 10 through a conduit 30. An air distributor 28 disperses air over the cross-section of regenerator 10 where it contacts spent catalyst in bed 34 having an upper bed level 35. Coke is removed from the catalyst by combustion with oxygen entering from distributor 28. Combustion by-products and unreacted air components rise upwardly along with entrained catalyst through the regenerator into the inlets of cyclones 26. Relatively catalyst-free gas collects in an internal chamber 38 which communicates with a gas conduit 40 for removing spent regeneration gas from the regenerator. Catalyst, separated by the cyclones drops from the separators through dip leg conduits 42 and returns to bed 34.

Regeneration vessel 10 will typically have a refractory lined metal shell 24 which is capable of withstanding temperatures within the regenerator in excess of 815° C. (1500° F.). This makes the regenerator vessel suitable for high operating temperatures. An accessway 76 is positioned at a lower section of shell 24. Looking at accessway 76 from the outside of the regenerator vessel, it is positioned a short distance above a support skin 64 from which the regenerator is supported by a suitable structure (see FIG. 2). Looking at accessway 76 from the interior of the regenerator, it is positioned a short distance above distributor 28 and in operation with at least a portion of its vertical dimension below the top of catalyst bed surface 35. Accessway 76 serves as both a manway for the movement of maintenance personnel in out of the regeneration vessel when the interior of the vessel, such as the refractory lining, or the equipment located therein needs servicing. Accessway 76 usually has a large diameter so that equipment such as cyclones 26 may be brought in and out of the vessel through the accessway. Accessway 76 consists of an end cover 64 connected to a vessel nozzle 66 by a horizontal passageway extension 72 and a pair of flanges 68. A set of flanges 68, of the usual bolted construction allows the end cover 64 to be removed and reinstalled as necessary. Interior portions of the end cover, flanges and nozzle associated with accessway 62 are also internally refractory lined to withstand the high regenerator temperatures. A catalyst cooler 70 depends from the nozzle extension 72 that extends from nozzle 66. Catalyst cooler 70 includes a tube section 74 that depends in a substantially vertical direction from nozzle extension 72. A conduit 75 communicates the top of extension 72 with regeneration vessel 10 at a location above bed 34.

Figure 2:
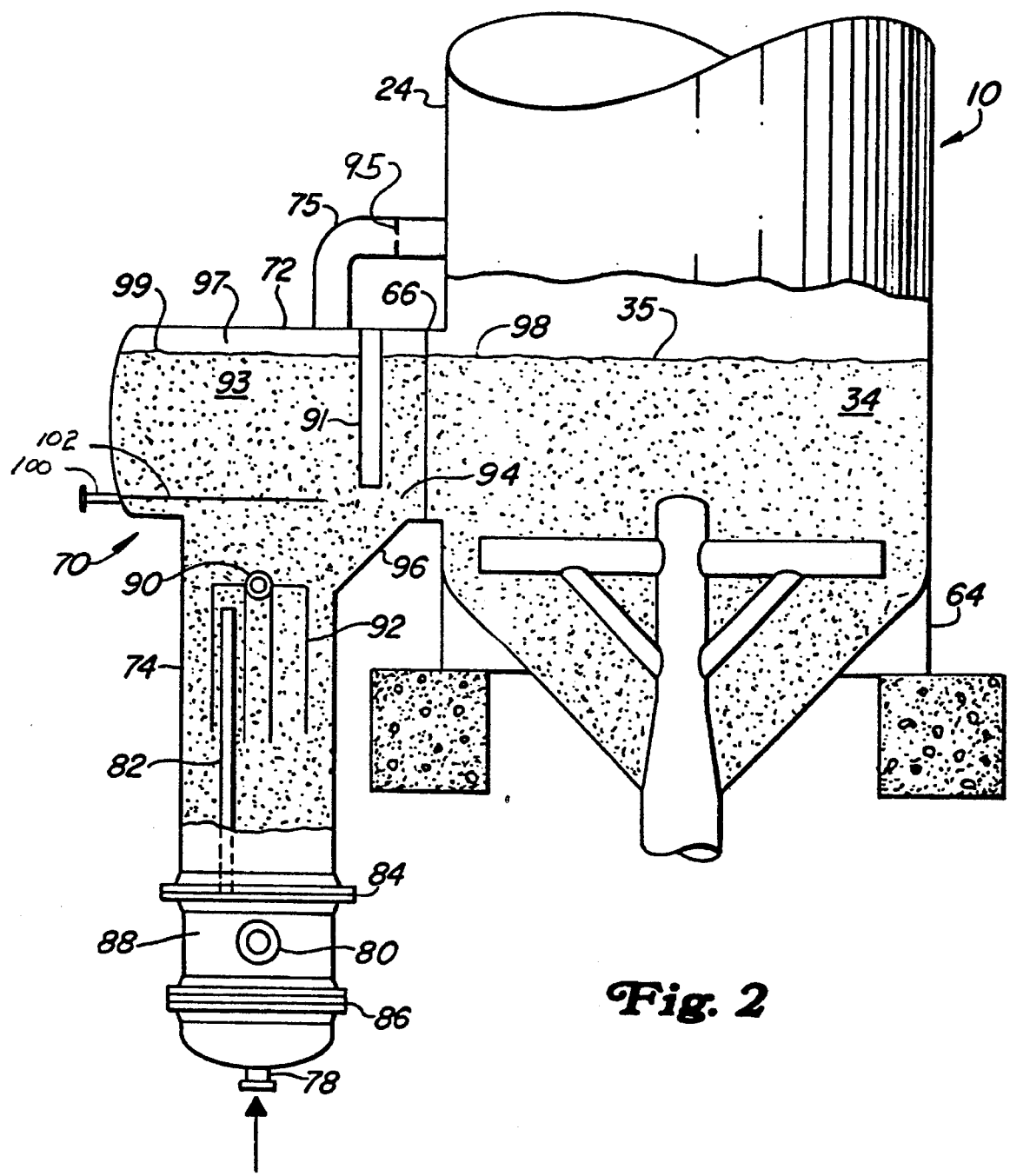
FIG. 2 shows an enlarged section view of the exchanger of this invention in a first operational mode.

Additional details of the catalyst cooler arrangement and installation of FIG. 1 are shown in FIG. 2. The cooler shown in FIG. 2 is a backmix type cooler. Tube section 74 of cooler 70 houses a heat exchanger having catalyst on its shell side and a heat exchange medium, circulated by lines 78 and 80, on the tube side of a tube bundle 82. The tube bundle 82 shown in the exchanger of FIG. 2 is a bayonet type in which all of the tubes are attached to a single tube sheet located at the bottom of the heat exchanger. In the bayonet type tube design the sealed outer tube 82 has an unattached top end and a bottom end fixed to a tube sheet 84. The outer tube covers an internal tube that extends from just below the top of the bayonet tube to a lower tube sheet 86. The heat exchange fluid travels up the internal tubes and downwardly between the inner tube and the outer tube where it is collected in a chamber 88 located between upper tube sheet 84 and lower tube sheet 86. A typical configuration of tubes in the bayonet-type bundle would be one inch tubes each ascending from an inlet manifold in the head of the exchanger up into the shell through a three inch tube sealed at its top. Each one inch tube empties into the three inch tube in which it is contained just below the sealed end of the three inch tube. A liquid, such as water, would be passed up into the one inch tubes, would empty into the three inch tubes, would absorb heat from the hot catalyst through the wall of the three inch tubes as it passed downward through the annular space of the three inch tubes and would exit the heat exchanger, at least partially vaporized, from the outlet manifold. The preferred heat exchange medium would be water which, in further preference, would change only partially from liquid to gas phase when passing through the tubes. It is also preferable to operate the heat exchanger so that the exchange medium is circulated through the tubes at a constant rate.

Fluidizing gas, preferably air, enters the exchanger through an aeration inlet 90 and is distributed between the tubes by distributor 92. A baffle 91 together with the tube extension 72 forms a catalyst cycling zone in the form of a catalyst retention chamber 93. Baffle 91 extends to the sides of conduit extension 72 and prevents gas or catalyst flow into or out of the chamber through nozzle 72 above the bottom of baffle 91. As fluidizing gas leaves distributor 92, it rises and collects first in retention chamber 93. A flow restriction 95 controls the venting of fluidizing gas out of retention chamber 93. Additional fluidizing gas may enter the retention chamber 93 above heat exchange tubes 82 via a nozzle 100 and a distributor 102.

The lower portion of tube section 74 is cylindrical in shape. However, where the tube section attaches to the lower side of the nozzle extension 72, the cooler is enlarged so that its width in a direction parallel to principal direction of the nozzle is larger than the diameter of the cylindrical portion. The upper portion of the tube section is enlarged in this way to minimize the horizontal distance across the nozzle so that circulation of catalyst between the regenerator and the cooler is enhanced. Therefore, by providing an angled section 96 at the upper end of the tube section 74, catalyst circulation around baffle 91 is through an opening 94 that serves as the passageway for the circulation of catalyst into and out of the cooler. Opening 94 has only a relatively small flowing cross section which still provides sufficient circulation when used with the pumping method of this invention.

Figure 3:
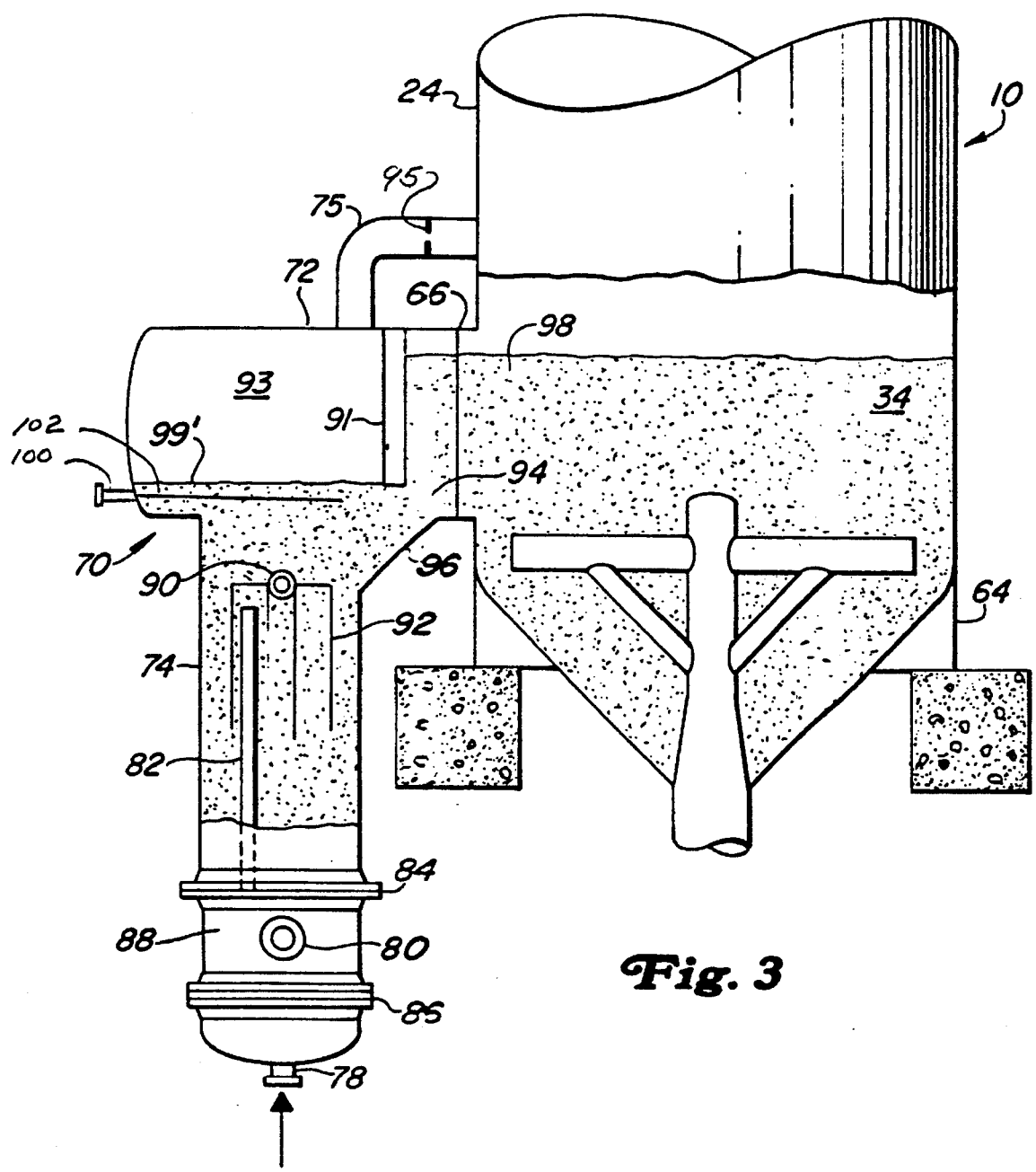
FIG. 3 shows an enlarged section view of the exchanger of this invention in a second operational mode.

The same arrangement of a backmix cooler is depicted in FIG. 3. FIG. 3 differs from FIG. 2 only in regard to the level of dense phase catalyst in the catalyst cooler. Together FIGS. 2 and 3 demonstrate the cyclic operation of this invention in pumping catalyst into and out of the backmix cooler. Looking then again at FIG. 2, the drawing represents an operational state wherein restriction 95 provides enough flow area such that fluidizing gas entering from distributor 92 vents freely out of the top of cooler 70 creating a pressure drop of preferably less than 0.25 psi across conduit 75 and preferably less than 0.10 psi. After sufficient time following a pulse of pressure, catalyst in the cooler has an upper bed level 99 at the same height as the top 35 of catalyst bed 34. The catalyst exchange cycle begins by increasing the flow rate of fluidizing gas into chamber 93. The additional fluidizing gas may enter through aeration inlet 90 and/or optionally through nozzle 100 and distributor 102. As the flow of fluidizing gas increases pressure drop across restriction 95 increases and the level of catalyst drops. The pulse of additional fluidizing gas will across restriction 95 will preferably increase pressure drop to at least 0.5 psi and more preferably to more than 0.5 psi. Downward displacement of catalyst typically continues until the catalyst in cooler 70 reaches a lower bed level 99' as shown in FIG. 3. Once the catalyst in the cooler reaches level 99', additional fluidization gas flows around the bottom of baffle 91 and into regeneration vessel 10. The second half of the cycle begins by returning the flow of fluidizing gas into chamber to 93 to normal levels to reduce pressure drop across nozzle 95. As gas flow out of chamber 93 returns to normal level, catalyst again enters chamber 93 until it reaches bed level 99 which equals the level of the catalyst regenerator bed 34. In this manner, a large volume of hot catalyst continually circulates back and forth through the inlet 94 of the cooler 70. The addition rate of the fluidizing gas pulse determines the amount of time required to displace catalyst out of chamber 93. Together the addition rate of the pulse and the regulation of pulse frequency controls the total catalyst flux through opening 94 into chamber 93. By varying the fluidizing gas pulse rate and the pulse frequency the total catalyst circulation in and out of the cooler may be controlled over a wide range of cycle times. In addition, the time for addition of catalyst to the cooler may vary in relation to the time for displacement of catalyst out of chamber 93. Normally the time period for filling chamber 93 and for displacing catalyst from chamber 93 will be in a range of from 3 seconds to 15 minutes.

Cyclic variation in catalyst temperatures within the cooler may provide variations in the temperature of the cooling medium. In order to avoid variation in temperature the regenerator vessel can include more than one cooler and the cooling medium can pass in series through the coolers. Cyclic fluctuations in catalyst temperature will not generally disrupt the operation of the regeneration due to the large volume of catalyst present in the regenerator.

A common alternative arrangement for the catalyst cooler is to insert the tube bundle of the catalyst cooler into the top of the catalyst cooler. In this type of arrangement the manifolds for delivery and recovery of the cooling fluid are at the top of the catalyst cooler and the tubes depend downward from the manifold section. Those skilled in the art will be aware of other alternative arrangements which are not limited except by the scope of the appended claims.

What is claimed is:

1. A method for indirect heat exchange between fluidized particles and a heat exchange fluid comprising:

a) collecting particles in a catalyst bed;

b) transferring said particles to a heat exchange zone through a particle exchange passageway;

c) transferring heat between the particles in said heat exchanger and a heat transfer fluid by indirect heat exchange in said heat exchange zone;

d) fluidizing the particles in said heat exchange zone, at least in part, by introducing a fluidizing gas into said heat exchange zone;

e) passing fluidizing gas to a particle cycling zone located in an upper portion of said heat exchange zone;

f) venting fluidizing gas from said particle cycling zone through a flow restriction at a first rate; and, g) periodically increasing the flow of fluidizing gas from into said cycling zone to a second rate to increase pressure drop across said flow restriction by at least 0.5 psi and to intermittently reduce the quantity of catalyst particles in said particle cycling zone and cause particles to flow from said heat exchange zone to said catalyst bed through said passageway or with said vented fluidizing gas.

2. The process of claim 1 wherein said heat exchange zone operates as a heat removal zone, hot particles are transferred into an upper portion of said heat removal zone and relatively cool particles are withdrawn from said upper portion of said heat removal zone through said passageway.

3. The process of claim 1 wherein said particle cycling zone is located at the top of said heat exchanger above the indirect heat exchange of said heat exchange fluid with said heat exchange particles.

4. The process of claim 1 wherein said fluidizing gas creates a pressure drop of less than 0.25 psi at said first rate.

5. The process of claim 1 wherein particles flow from said heat exchange zone to said catalyst bed through said passageway.

6. The process of claim 1 wherein said heat exchange zone contains heat exchange tubes and fluidizing gas, to increase the flow of fluidizing gas to said second rate, flows into an upper portion of said heat exchange zone above said heat exchange tubes.

7. An apparatus for cooling fluidized particles comprising:
a) a vertically elongated heat exchanger for indirectly contacting said particles with a heat exchange fluid;
b) a particle cycling chamber defined at least in part by an upper portion of said heat exchanger;
c) a plurality of heat exchange tubes in said heat exchanger;
d) a passageway for adding and withdrawing particles from said heat exchanger defining an opening in said heat exchanger below said particle cycling chamber;
e) means for adding gas to said heat exchanger at a first rate and periodically increasing the flow of gas to said particle cycling chamber to a second higher rate; and
f) a conduit in communication with said particle cycling chamber containing a flow restrictor for restricting the flow of gas through said conduit.

8. The apparatus of claim 7 wherein said means for periodically increasing the gas rate comprises a gas distributor located above said heat exchange tubes.

* * * * *

UNITED STATES PATENT AND TRADEMARK OFFICE
CERTIFICATE OF CORRECTION

PATENT NO. : 5,452,757
DATED      : September 26, 1995
INVENTOR(S) : DAVID A. LOMAS It is certified that error appears in the above-identified patent and that said Letters Patent is hereby corrected as shown below:

In the cover page, [73] Assignee: Change "UPO" to --UOP--.

Signed and Sealed this

Nineteenth Day of December, 1995

Attest:

BRUCE LEHMAN

Attesting Officer    Commissioner of Patents and Trademarks